United States Patent Office 3,764,303
Patented Oct. 9, 1973

3,764,303
Fe-Cr-Ni-Co-Mn-Mo WELDING MATERIAL AND BLANK WIRE AND BARE BAND ELECTRODE FORMS THEREOF
Gerhard Alfred Schmidt, 24 Mariazellerstrasse, Kapfenberg, Austria
No Drawing. Filed July 10, 1970, Ser. No. 53,997
Claims priority, application Austria, July 11, 1969, A 6,648/69
Int. Cl. C22c *39/20*
U.S. Cl. 75—128 A                    12 Claims

ABSTRACT OF THE DISCLOSURE

A composite welded article comprising a high-strength low-temperature steel, in particular a steel alloy containing about 9% nickel, which is welded by means of an arc-welding process with a Ni-Cr-Fe alloy consisting essentially of 0.2% C, 5–30% Cr, 5–30% Ni, 6–60% Co, traces to 12% Mn, traces to 0.65% Si, traces to 3.5% Mo and the remainder iron and the inevitable impurities.

BACKGROUND OF THE INVENTION

The invention relates to welded articles consisting of high-strength low-temperature steel, in particular steel containing about 9% nickel. The article is welded by means of the arc-welding technique with a welding material of special composition.

The technological developments of recent times have continuously increased the requirements for fabrication of the special type of high-strength low-temperature steel which is used for the storage and transportation of liquid gases. Such steels must have high-strength properties while being subjected to temperatures of less than −100° C. Steels containing about 9% of nickel are generally used for this purpose. The welding of this type of steel has been generally carried out heretofore with welding materials having a high nickel content and about 12–20% chromium as well as other alloying elements. These types of known welding materials are quite costly and have in addition, the drawback of having a tendency to crack under internal tensional forces due to shrinkage, so that only very skilled welding personnel can handle this type of a welding operation.

Attempts have been made to ameliorate the aforedescribed drawbacks of the known welding materials by adding certain austenitic materials, for example, of the type 25/20 CrNi, 18/8/6 CrNiMn, 16/13/7/3 CrNiMnW, etc. However, all of these known additional materials, when added to the welding material, result in an overall welding material that has sufficient toughness (measured at −200° C.), but has an elastic limit (measured at room temperature) which is considerably lower than the elastic limit of the base material, so that it is necessary to over-dimension the welded article to be constructed.

SUMMARY OF THE INVENTION

It is therefore a general object of this invention to provide a welding material for high-strength low-temperature base materials, in particular, steel containing about 9% nickel, which has the following improved physical properties: improved resistance against heat cracking; reduced number of pores per surface unit; improved notch impact strength at low temperatures; and substantially higher elastic limits.

The welding material which is deposited on the welded article consisting of high-strength low-temperature steel, in particular, steels containing about 9% of nickel, is composed of the following alloying elements: 0.2% C, 5–30% Cr, 5–30% Ni, 6–60% Co, traces to 12% of Mn, traces to 0.65% of Si, traces to 3.5% of Mo, and the remainder iron with the unavoidable impurities.

The composition of the welding material alloy which is deposited on the weld, has preferably the following composition (and may actually contain also an additional 5–15% of W): 0.12% C, 5–20% Cr, 5–25% Ni, 9–45% Co, 2.5–12% Mn, traces to 0.45% Si, traces to 2.2% Mo, and 6–13% W, the remainder iron with the unavoidable impurities.

It has been found that particularly favorable welding characteristics can be obtained when, in accordance with the invention, the welding material alloy to be deposited has the following composition: traces to 0.08% C, traces to 0.25% Si, 12–18% Cr, 7–15% Ni, 9–32% Co, 4–12% Mn, 1.5–2.0% Mo, and 8–12% W, the remainder iron with the unavoidable impurities.

A deposition of the aforedescribed composition can be obtained by means of arc-welding with coated electrodes, welding by means of a shielding gas or a covered arc and a blank metal electrode, respectively, a corresponding filler wire, without preheating of the parts to be welded.

The invention is not only concerned with the actual alloying material that is deposited on the article to be welded, but also with the material used for welding, for example, the composition of the metal electrodes used in the welding process. Thus, the welding material used for producing the deposition on the welded seam of articles consisting of high-strength low-temperature steel, in particular steel containing about 9% nickel, should have the following composition: traces to 0.2% of carbon in dissolved form, that is, as graphite, i.e. a ferrous alloy or a carbide, 5–30% of Cr, 5–30% of Ni, 6–60% of Co, traces to 12% of Mn, traces to 3.5% of Mo, and 5–15% of W if required, the remainder iron and the unavoidable impurities.

If the welding material takes the form of a sheathed or coated electrode, then the core wire thereof has the afore-recited composition, whereas the fluxing material has the following composition: 25–50% of calcium-, strontium- and/or barium carbonate, 5–50% of fluorite, limestone flux, calcium fluoride or cryolite, 2–15% of a de-oxidizing material such as ferrosilicon, ferromanganese or similar substances and, under certain circumstances, up to 45% of titanium dioxide.

In accordance with the invention several coated or sheathed electrodes have been proposed for welding with AC—respectively DC current. Thus, for the DC current welding a calcium-basic electrode having a fluxing material coating consisting of 30–50% calc-spar, calcite ($CaCO_3$), 30–50% of fluorite, limestone flux and calcium fluoride ($CaF_2$) and 5–15% of a deoxidizing material, in particular ferrosilicon, should be used.

When welding with AC and DC current there should be, in contradistinction thereto, provided a fluxing material coating having 15–35% calc-spar, calcite ($CaCO_3$), 4–10% of fluorite, limestone flux, calcium fluoride, 35–45% of titanium dioxide (rutile), 5–25% of mineral silicate, in particular aluminum silicate, respectively bentonite, and 5–15% of a deoxidizing material.

It is to be noted that the fluxing material sheathing also may contain alloying additions, for example, cobalt powder in a quantity corresponding to the substantially reduced constituent thereof in the core wire. As binding material for the fluxing material sheathing, there are to be used preferably those silicate types, that is, water solutions of sodium and/or potassium silicates, under certain circumstances, in combination with reduced other additions, which can be applied with auxiliary molding means or the like.

It is also, of course, within the scope of the invention to use a welding material in the form of a blank wire or band having the following composition: 0.20% C, 5–30% Cr, 5–30% Ni, 6–60% Co, traces to 12% of Mn, traces to 3.5% of Mo, and under certain circumstances, 5–15% of W, the remainder of iron with its unavoidable impurities.

The welding material may, in accordance with this invention, also be formed as a filler wire, whereby the filler mass includes slag-forming constituents and allowed constituents, in particular cobalt powder. It should be noted that all of the aforementioned percentage ranges are meant to be percentages by weight and that the unavoidable impurities of P and S of the alloyed deposition are less than 0.025%.

DESCRIPTION OF PREFERRED EMBODIMENTS

The invention will be described hereinafter in conjunction with a plurality of examples, but is not limited to the examples given hereinbelow.

Example 1

A sheet metal having a thickness of 16 mm. and consisting of a nickel-steel having a 9% nickel content and the following composition:

| | Percent |
|---|---|
| C | 0.07 |
| Si | 0.29 |
| Mn | 0.41 |
| Ni | 9.1 |
| Mo | 0.04 |
| Al | 0.016 | was provided with a V-seam having an open angle of 70° and a fillet of 2 mm. height was prepared. The prepared portions of the sheet metal were welded together by means of a sheathed electrode in accordance with the invention (having a core wire diameter of 4 mm., and an electrode wire diameter of 6.4 mm.) with an AC current (145 a., 26 v.) in 10 different positions. The core wire had the following composition:

| | Percent |
|---|---|
| C | 0.11 |
| Si | 0.32 |
| Mn | 1.30 |
| Cr | 20.0 |
| Ni | 10.1 |
| Co | 37.2 |
| W | 9.75 |

The fluxing material coating of the electrode had the following composition:

| | Percent |
|---|---|
| Calc-spar, calcite | 14.6 |
| Fluorite, limestone flux, calcium fluoride | 6.2 |
| Rutile | 37.5 |
| Aluminum silicate | 15.4 |
| FeMo | 9.3 |
| Mn-metal | 6.2 |
| Auxiliary pressed material and stable Na-water glass | Remainder |

The following table sets forth the chemical composition and the mechanical values of the deposited welded material, which was found to be resistant to cracking and relatively free of pores:

TABLE I

Composition of the deposited welded material (percent: C, 0.10; Si, 0.46; Mn, 2.08; Cr, 17.64; Mo, 2.02; Ni, 9.13; Co, 33.56; W, 8.67.
Mechanical values:

| Hardness HB 10, kp./mm.² | Elastic limit, kp./mm.² | Tensile strength, kp./mm.² | Impact-bending-strength, RT (20° C.) | | Charpy-V (kpm.) −196° C. | |
|---|---|---|---|---|---|---|
| 185 | 62.5 | 79.2 | 11.5 13.7 | 12.1 14.2 | 7.0 7.8 | 7.1 9.0 |

For comparing the values set forth hereinabove, there is set forth hereinbelow comparative data for a large number of welding examples carried out in an analogous manner and by means of (a) High nickel-containing sheathed electrodes (having a welding material of the following composition: 0.04% C, 0.2% Si, 1.6% Mn, 15.2% Cr, 8.2% Fe, 1.0% Mo, 2.2% Nb, remainder nickel) and (b) An austenitic sheathed electrode (of the type 16/13/7/3 CrNiMnW) with the following results:

TABLE II

| | Elastic limit, kp./mm.² | Tensile strength, kp./mm.² | Impact-bending-strength, RT | CVN (kpm.) −196° C. |
|---|---|---|---|---|
| Ni-base electrode | 42–47 | 67–72 | 10–11 | 6–9 |
| Type 16/13/7/3 | 45–50 | 65–70 | 10–12 | 5–7 |

Example 2

The tests were carried out in an analogous manner as in Example 1 with the difference that DC current was used and an electrode having a sheathing containing cobalt was used as the welding material, and having the following composition.

Core wire composition:

| | Percent |
|---|---|
| C | 0.026 |
| Si | 0.33 |
| Mn | 4.83 |
| Cr | 17.97 |
| Ni | 15.54 |
| Mo | 0.01 |

Composition of the sheathing layer:

| | Percent |
|---|---|
| Calc-spar, calcite | 17.7 |
| Fluorite, limestone flux, calcium fluoride | 27.8 |
| Mn-metal powder | 7.1 |
| Fe-Si | 0.89 |
| Fe-Cr | 2.36 |
| Fe-Mo | 5.3 |
| Bentonite | 1.77 |
| Fe-Ti | 0.59 |
| Co-metal powder | 29.6 |
| Auxiliary pressing material | 0.59 |
| Stable water glass | Remainder |

TABLE III

Composition of the welding material (percent): C, 0.06; Si, 0.17; Mn, 5.12; Cr, 15.48; Mo, 1.69, Ni, 13.01; Co, 11.16.
Mechanical values:

| Hardness HB 10, kp./mm.² | Elastic limit, kp./mm.² | Tensile strength, kp./mm.² | Impact-bending-strength, RT (20° C.) | | Charpy-V (kpm.) −19 | 6° C. |
|---|---|---|---|---|---|---|
| 179 | 68.2 | 74.1 | 10.4 10.9 | 10.9 11.5 | 5.2 5.7 | 5.6 6.3 |

Example 3

With this example the same welding conditions prevailed and a sheathed electrode was used having the following composition.

Core wire composition:

| | Percent |
|---|---|
| C | 0.017 |
| Si | 0.23 |
| Mn | 1.77 |
| Cr | 20.09 |
| Ni | 10.47 |

The sheathing had the following composition:

| | Percent |
|---|---|
| Rutile | 24.3 |
| Fluorite, limestone flux, calcium fluoride | 4.3 |
| Calc-spar, calcite | 17.1 |
| Potassium feldspar | 1.43 |
| Bentonite | 2.86 |
| Pressed filler material | 0.72 |
| Mn-metal powder | 8.6 |
| Fe-Mo | 6.43 |
| Co-metal powder | 28.5 |
| Stable water glass | Remainder |

TABLE IV

Composition of the welded material (percent): C, 0.028; Si, 0.23; Mn, 1.87; Cr, 14.60; Mo, 1.75; Ni, 8.9; Co, 11.69.
Mechanical values:

| Hardness HB 10, kp./mm.$^2$ | Elastic limit, kp./mm.$^2$ | Tensile strength, kp./mm.$^2$ | Impact-bending-strength, RT (20° C.) | | Charpy-V (kpm.) −196° C. | |
|---|---|---|---|---|---|---|
| 180 | 64.2 | 69.1 | 7.3 | 7.5 | 3.8 | 4.8 |
| | | | 7.5 | 7.6 | 4.2 | 4.5 |

Example 4

In this example the sheet metal consisted of a nickel-steel having a 9% nickel content and this sheet metal was welded with a blank current- conducting wire having a 0.8 mm. diameter with an argon gas (=MIO-short arc-welding). The chemical composition of the wire, which in this particular case was practically identical to the chemical composition of the welded deposited material, was as follows:

TABLE V

Composition of the blank wire (percent): C, 0.11; Si, 0.25; Mn, 4.2; Cr, 16.3; Mo, 1.65; Ni, 16.2; Co, 16.0.
Mechanical properties of the welded deposited material:

| Hardness HB 10, kp./mm.$^2$ | Elastic limit, kp./mm.$^2$ | Tensile strength, kp./mm.$^2$ | Impact-bending-strength, RT (20° C.) | | Charpy-V (kpm.) −196° C. | |
|---|---|---|---|---|---|---|
| 180 | 60.9 | 76.3 | 11.5 | 12.3 | 7.2 | 7.6 |
| | | | 12.9 | 13.6 | 8.1 | 8.5 |

Example 5

In this case, the examples were welded with a filler wire (having an exterior diameter of 3.25 mm., and an interior diameter of .180 mm.), which was formed by a metallic sheathing and a filler mass comprising 5% of calcium carbonate, 5% of calcium fluoride, and 90% of a cobalt powder. The metallic sheathing contained 0.03% C, 0.3% Si, 1.5% Mn, 18.1% Cr, 10.2% Ni, and 1.7% Mo, the remainder iron.

The opening angle of the V-seam formed by the weld amounted to 60°, whereby the fillet, as in the other two examples, had a height of 2 mm. The root-position of the weld was formed by means of a manual welding with manual electrodes (core wire diameter 3.25 mm.) in accordance with Example 2 and thereafter the filling positions were automatically built up in accordance with the UP-process and by using a filler wire with only 4 positions.

Welding data:

| | |
|---|---|
| Current, a. | 350–400 |
| Welding voltage, v. | 30 |
| Welding velocity, cm./min. | 50 |

Composition of the welding powder:

| | |
|---|---|
| $SiO_2$, percent | 25 |
| CaO, percent | 25 |
| $CaF_2$, percent | 20 |
| $Al_2O_3$, percent | 5 |
| $Fe_2O_3$, percent | 4 |
| $ZrO_2$, percent | 10 |
| Metallic materials, in particular Mn and Ni, percent | Remainder |

TABLE VI

Composition of the deposited welded material (percent): C, 0.08; Si, 0.21; Mn, 1.8; Cr, 17.2; Ni, 12.1; Mo, 1.64; Co, 9.82.
Mechanical values of the deposited welded material:

| Hardness HB 10, kp./mm.$^2$ | Elastic limit, kp./mm.$^2$ | Tensile strength, kp./mm.$^2$ | Impact-bending-strength, RT (20° C.) | | Charpy-V (kpm.) −196° C. | |
|---|---|---|---|---|---|---|
| 180 | 63.3 | 69.7 | 9.4 | 9.8 | 4.9 | 5.3 |
| | | | 9.6 | 9.8 | 5.5 | 6.0 |

Although the invention is illustrated and described with reference to a plurality of preferred embodiments thereof, it is to be expressly understood that it is in no way limited to the disclosure of such a plurality of preferred embodiments but is capable of numerous modifications within the scope of the appended claims.

What is claimed is:

1. A welding material for welding articles of high-strength low-temperature steel, such as 9% nickel steel, wherein said welding material has the following constituents:

0.12% C being selected from the group of graphite, a ferrous alloy and carbide;
5–20% Cr;
5–25% Ni;
9–45% Co;
traces to 0.45% Si;
2.5 to 12% Mn;
traces of 2.27 Mo; and the remainder iron with traces of impurities.

2. The welding material as set forth in claim 1, wherein said material has additionally tungsten in an amount of 6–13%.

3. The welding material as set forth in claim 1, wherein said welding material is formed as a blank wire.

4. The welding material as set forth in claim 1, wherein said welding material is formed as a band electrode.

5. The welding material as set forth in claim 3, and including 6–13% W.

6. The welding material as set forth in claim 4, and including 6–13% W.

7. A welding material for welding articles of high-strength low-temperature steel, such as 9% nickel steel, wherein said welding material consists essentially of the following constituents:

0.12% C being in solution and
5–20% Cr;
5–25% Ni;
9–45% Co;
traces to 0.45% Si;
2.5 to 12% Mn;
traces to 2.2% Mo; and
the remainder iron with traces of impurities.

8. The welding material as set forth in claim 7, wherein said material has additionally tungsten in an amount of 6–13%.

9. The welding material as set forth in claim 7, wherein said welding material is formed as a bare wire.

10. The welding material as set forth in claim 7, wherein said welding material is formed as a bare band electrode.

11. The welding material as set forth in claim 9, and including 6–13% W.

12. The welding material as set forth in claim 10, and including 6–13% W.

(References on following page)

References Cited

UNITED STATES PATENTS

| | | | |
|---|---|---|---|
| 3,031,343 | 4/1962 | Pfieffer | 75—125 X |
| 3,184,577 | 5/1965 | Witherell | 75—128 W X |
| 2,515,774 | 7/1950 | Johnson | 75—171 |
| 2,436,867 | 3/1948 | Lee | 219—8 |
| 2,875,104 | 2/1959 | Bergh et al. | 117—207 X |
| 2,983,632 | 5/1961 | Griffiths et al. | 117—207 X |
| 3,023,130 | 2/1962 | Wasserman et al. | 117—207 X |
| 3,084,074 | 4/1963 | Wasserman et al. | 117—207 X |
| 3,211,582 | 10/1965 | Wasserman et al. | 117—205 |
| 3,235,405 | 2/1966 | Quaas | 117—207 X |
| 3,272,963 | 9/1966 | Wasserman et al. | 117—205 X |
| 3,330,934 | 7/1967 | Quaas | 117—207 |
| 3,583,471 | 6/1971 | Kemming | 219—145 X |

L. DEWAYNE RUTLEDGE, Primary Examiner

U.S. Cl. X.R.

75—128 B, 128 W; 117—207; 219—146